United States Patent [19]

Schluter et al.

[11] 3,765,254

[45] Oct. 16, 1973

[54] GIANT ANTIFRICTION BEARING OPERABLE BY A PRESSURE MEDIUM

[75] Inventors: Wilhelm Schluter, Dartmund-Gartenstadt; Heinz Pohler, Herdecke-Kirchende; Albert Hagen, Dartmund, all of Germany

[73] Assignee: Hoesch Aktiengesellschaft, Dartmund, Germany

[22] Filed: July 20, 1972

[21] Appl. No.: 273,609

[30] Foreign Application Priority Data

July 7, 1971 Germany............P 21 37 225.8

[52] U.S. Cl....................... 74/55, 308/230, 308/122
[51] Int. Cl............................................. F16h 25/18
[58] Field of Search ............... 308/122, 230; 74/55, 74/804, 805

[56] References Cited
UNITED STATES PATENTS

| | | | |
|---|---|---|---|
| 1,870,875 | 8/1932 | Scheuer | 74/805 |
| 2,461,121 | 2/1949 | Markham | 74/55 |
| 2,623,353 | 12/1952 | Gerard | 308/122 |
| 2,754,712 | 7/1956 | Leblans | 308/122 |
| 2,874,594 | 2/1959 | Sundt | 74/805 |
| 2,981,572 | 4/1961 | Kuhne | 308/122 |
| 3,053,589 | 9/1962 | Cameron | 308/122 |
| 3,101,980 | 8/1963 | Love | 308/122 |
| 3,104,844 | 9/1963 | Bahnsen | 308/230 |
| 3,192,799 | 7/1965 | Pamlin | 74/805 |
| 3,671,137 | 6/1972 | Ball | 308/122 |

Primary Examiner—Charles J. Myhre
Assistant Examiner—Wesley S. Ratliff, Jr.
Attorney—Walter Becker

[57] ABSTRACT

A giant antifriction bearing in which one of the race rings is adapted to be held stationary while the other one of its race rings is rotatable, and in which pressure medium operable means are arranged within the region between the inner and outer rings and are reciprocably guided by one of the race rings and cooperate with an undulated cam surface on the other race ring.

11 Claims, 7 Drawing Figures

PATENTED OCT 16 1973

PATENTED OCT 16 1973 3,765,254

GIANT ANTIFRICTION BEARING OPERABLE BY A PRESSURE MEDIUM

The present invention relates to a giant antifriction bearing operable by a pressure medium which serves as an intermediate member for a device composed of a rotatable part and a non-rotatable part and which comprises an outer and an inner ring. Of these two rings, one is connected to the rotatable part of the device and the other one is connected to the non-rotatable part of the device while elements are employed which are adapted to be actuated by a pressure medium and which rest against an undulated cam path. As antifriction bearings there may be employed one-row ball bearings, multi-row ball bearings or roller bearings, and also one-row or multi-row antifriction wire bearings (Drahtwalzlager) may be used.

Pressure medium drives for giant antifriction bearings are known, for instance, from Swedish Pat. No. 207,855 and from Belgian Pat. No. 732,645.

The arrangement of these known pressure fluid drives in combination with giant antifriction bearings in some instances has a certain disadvantage because, beyond the bearing cross section proper, they require a number of cylinders and pistons which take up the interior of the giant antifriction bearing and/or the space above and below the bearing plane which space is frequently urgently needed for placing other parts of the device. Moreover, these drives, in comparison with the antifriction bearing proper, have a frequently undesirable great weight and require structural elements which are difficult to produce.

It is, therefore, an object of the present invention to simplify the rotary drive by means of a pressure medium of giant antifriction bearings and to make such drive safer and more wear-resistant and also to make the cross section of the bearing including that of the pertaining pressure medium drive as small and space-saving as possible.

These and other objects and advantages of the invention will appear more clearly from the following specification in connection with the accompanying drawings, in which.

Figure 1:
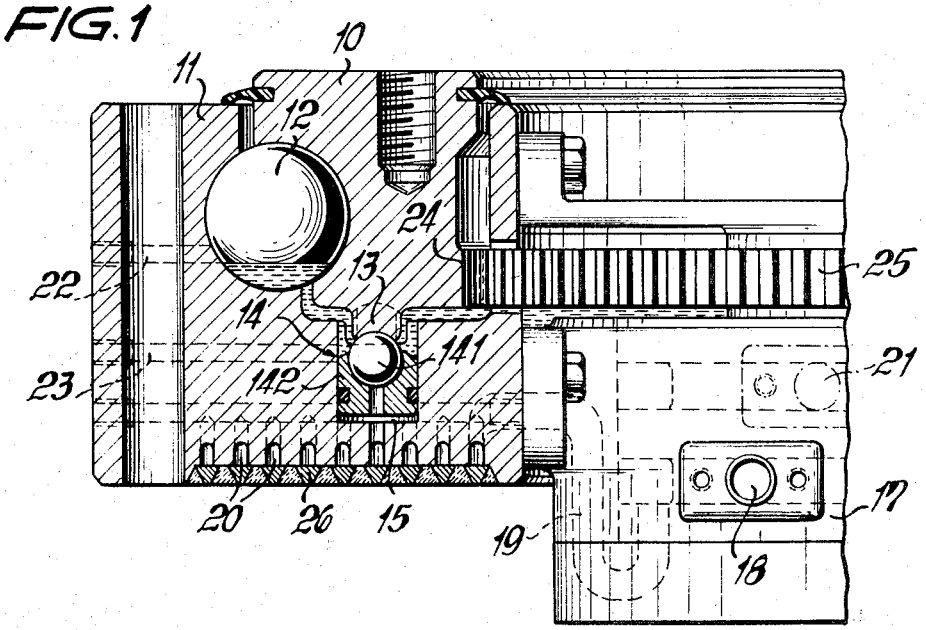
FIG. 1 illustrates a portion of a longitudinal section through a giant antifriction bearing with a pressure medium drive according to the invention.
Figure 2:
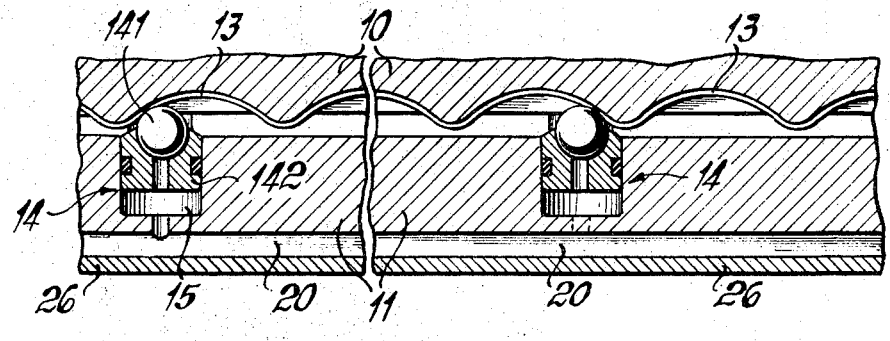
FIG. 2 shows the cooperation of the pressure medium actuated elements according to the invention with an undulated cam path.
Figure 3:
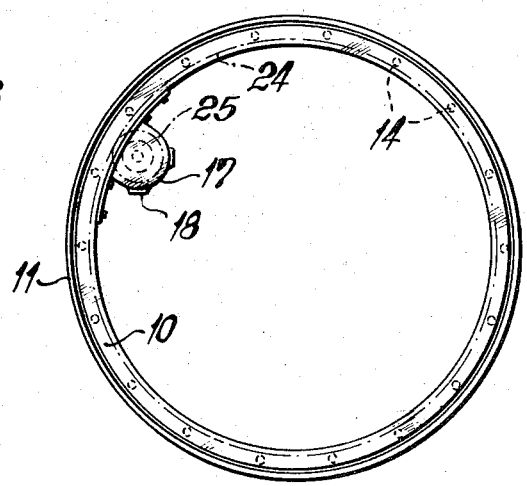
FIG. 3 shows a top view of the giant antifriction bearing of FIG. 1 but on a smaller scale than that of FIG. 1.

The giant antifriction bearing according to the present invention is characterized primarily in that the elements which are acted upon by the pressure medium are arranged in the region between the outer race ring and the inner race ring of the bearing. These elements acted upon by the pressure medium with the bores conveying the pressure medium are arranged either in the outer ring while the undulated cam path corresponding to these elements is provided on the inner ring, or the bores are provided in the inner ring, and the outer ring is provided with the undulated cam path.

The elements proper adapted to be acted upon by the pressure medium are guided in bores and may be designed as floating pistons provided with a continuous bore and receiving an antifriction body. According to a further embodiment of the invention, antifriction bodies only are employed as such elements in which instance, when using rollers as antifriction bodies, such rollers are expediently guided in bushings inserted into the respective bore.

The undulated cam path against which the elements rest may be machined either into the respective bearing ring — inner ring or outer ring — or may be designed as a separate ring insertable into the respective bearing ring.

The elements acted upon by the pressure medium are, depending on the respective conditions of operation and/or the structural requirements, so arranged that they may move either in axial or in radial direction.

Referring now to the drawings in detail, a giant antifriction bearing forming an intermediate member of a device comprising a rotatable and a non-rotatable part comprises an inner race ring 10 and an outer race ring 11 and conveys the occurring torques from the inner ring 10 by means of an antifriction body 12 to the outer ring 11 which is connected to the stationary part of the device, the inner ring, according to the specific example shown, being connected to the rotatable part of the device.

The inner ring 10 is provided with an undulated cam path 13 which is either machined directly into the inner ring 10 or is designed as a non-illustrated ring which is connectable to the inner ring 10. The cam path 13 serves for supporting pressure medium actuated elements 14 which in the illustrated embodiment are with the bores 15 conveying the pressure medium, for instance oil, arranged in the outer ring 11.

The number of the elements 14 adapted to be acted upon by the pressure medium, their base surface and their stroke as well the pitch of the cam path 13 depend on the torque which is to be conveyed. The ratio of the number of the elements 14 adapted to be acted upon by pressure fluid to the pitch of the cam path 13 is so selected that in any desired position of the outer ring 11 and the inner ring 10 relative to each other a change in the direction of rotation will be possible.

The circumference of the giant antifriction bearing should be provided with as many elements 14 as possible while the pitch of the cam path 13 should be selected as small as possible in order to realize a maximum of uniformity of the rotary movement. The number of the cam pitches and the number of the elements 14 depends on the magnitude of the required torque. The geometric form of the individual pitches of the cam path 13 is definitely determined by the requirement for a uniform torque over the full circular circumference, i. e., a rotary angle of 360°.

Figure 6:
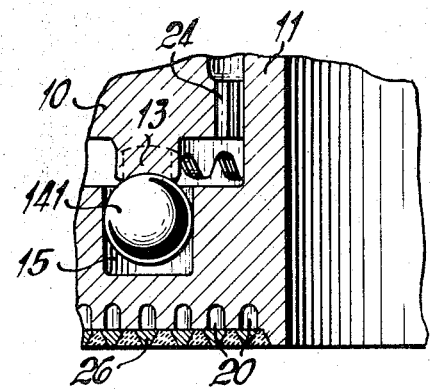
FIG. 6 shows an element formed merely by an antifriction body.
Figure 7:
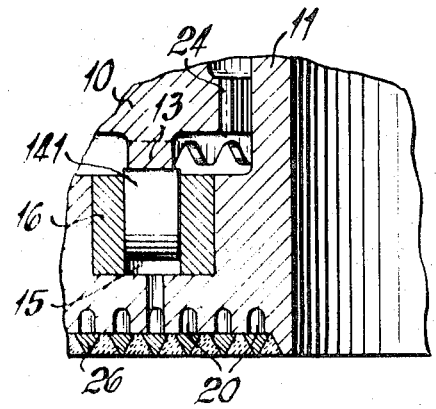
FIG. 7 shows an element formed of a roller guided in a bushing.

The inner ring 10 equipped with the cam path 13 is rotated as soon as the elements 14 are acted upon by the pressure medium. As elements 14 which convey the energy of the pressure medium and which correspond with the cam path 13 there are employed, for instance, antifriction bodies 141 (balls or rollers) which are hydrostatically journalled in pistons 142 having continuous bores 1421 while the pistons 142 are guided in the bores 15. If desired, however, there may also be employed antifriction bodies 141 alone (FIG. 6) or antifriction bodies 141 (for instance a roller) in combination with a bushing 16 (FIG. 7). When employing antifriction bodies 141 alone as elements 14 adapted to be acted upon by a pressure medium, the pertaining bores 15 may have any desired cross section differing from a circular cross section, for instance, a square or a rectangular cross section.

For controlling the pressure, a control unit 17 may be employed which may, for instance, be in the form of a plane rotary valve. From the compressed oil connection 18 of the control unit 17 the oil under pressure passes through the passages 19 and the annular passages 20 into the bores 15 which guide the elements 14 and acts upon the elements 14 whereas those elements 14 which are carrying out their return stroke return the oil through corresponding passages and through the oil return connection 21. The annular passages 20 are closed by a ring 26 which is welded thereto. The leakage oil flows off through a leakage oil bore 22. The oil discharge may be effected by an oil discharge bore 23. When a change in the direction of rotation is desired, the connection 18 for the compressed oil and the return connection 21 for the oil return are exchanged with each other.

The inner ring 10 is provided with teeth 24 meshing with a driving gear 25 of the control unit 17 for driving the rotary valve. The transmission ratio of the teeth 24 and the driving gear 25 depends on the pitch of the cam path 13 and must amount to a multiple whole. The running surface of the undulated cam path 13 may, depending on the stresses involved, be hardened or annealed.

The inner ring 10 and the outer ring 11 of the giant antifriction bearing are in most instances made of steel. For purposes of reducing the weight, they may also be made of light metal, and for obtaining a good corrosion resistance and for reducing the permeability, they may be made of bronze or of synthetic material. In such an instance the elements 14 are either provided in a special ring connected to one of the bearing rings or they are by means of bushings inserted into one of the bearing rings.

Figure 4:
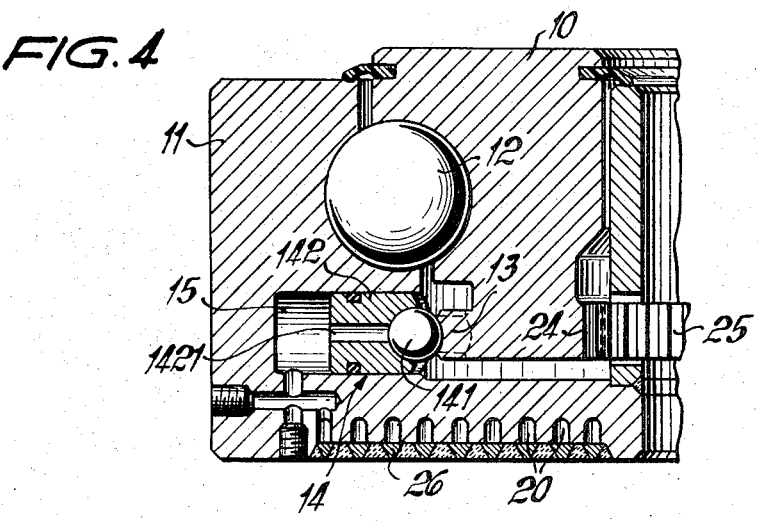
FIG. 4 shows a section of an antifriction bearing similar to that of FIG. 1 but with radially effective pressure medium actuated elements.
Figure 5:
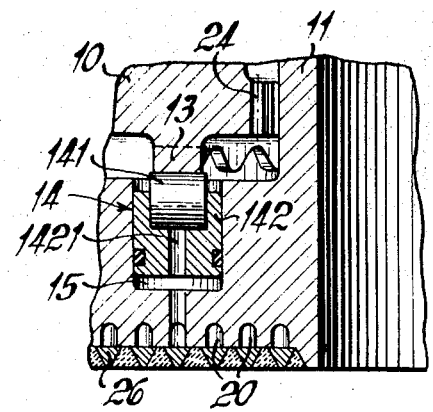
FIG. 5 shows a pressure medium actuated element consisting of an antifriction body in combination with a piston.

To meet the respective conditions of operation and/or the structural requirements, the elements 14 as well as the pertaining cam path 13 are arranged either in axial direction (FIG. 1) or in radial direction (FIG. 4).

As will be seen from the above, the advantage of the arrangement according to the present invention consists primary in the space-saving design. This solution may be employed where it is expedient, where the space surrounding the giant antifriction bearing is needed for other devices and structural elements. With regard to the exploitation of the cross section proper of the giant antifriction bearing for the mounting of the pressure medium drive, the especially low weight of the drive is to be mentioned. With antifriction bearings provided with a gear drive an increase in the operational safety is realized because the occurrence of a damage to the teeth is avoided. Also installation errors between the driving unit and the journalling do not occur. Finally, the construction according to the present invention needs only relatively seldom to be serviced in view of the automatic lubrication of the bearing with leakage oil.

It is, of course, to be understood that the present invention is, by no means, limited to the particular showing in the drawings but also comprises any modifications within the scope of the appended claims.

What we claim is:

1. A giant antifraction bearing which includes: an outer race ring, an inner race ring, one of said rings being adapted to be held stationary and the other ring being rotatable, and pressure medium operable means arranged within the region between said inner and outer rings and being reciprocably guided by one of said rings, the other one of said rings being provided with an undulated cam surface for cooperation with said pressure medium operable means.

2. A bearing according to claim 1, in which said pressure medium operable means are arranged in said outer ring, and in which said outer ring is provided with conduit means communicating with said pressure medium operable means and adapted to be connected to a source of pressure medium, said undulated cam surface being provided on said inner ring.

3. A bearing according to claim 1, in which said pressure medium operable means are arranged in said inner ring, and in which said inner ring is provided with conduit means communicating with said pressure medium operable means and adapted to be connected to a source of pressure medium, said undulated cam surface being provided on said outer ring.

4. A bearing according to claim 1, in which one of said rings comprises guiding passage means reciprocably receiving and guiding said pressure medium operable means.

5. A bearing according to claim 1, in which said pressure medium operable means include floating piston means provided with a bore extending all the way through said piston means in the direction of the reciprocatory movement thereof, and antifriction body means supported by said piston means for cooperation with said undulated cam surface.

6. A bearing according to claim 1, in which said pressure medium operable means include rotatable bodies.

7. A bearing according to claim 1, in which said pressure medium operable means include bushing means and roller means guided in said bushing means.

8. A bearing according to claim 1, in which said undulated cam surface is a part of said other one ring.

9. A bearing according to claim 1, in which said undulated cam surface forms a part of an annular member connected to said other one ring.

10. A bearing according to claim 1, in which said pressure medium operable means are movable in axial direction of said rings.

11. A bearing according to claim 1, in which said pressure medium operable means are movable in radial direction of said rings.

* * * * *